United States Patent [19]

Namura et al.

[11] 4,257,457

[45] Mar. 24, 1981

[54] DISCHARGE VALVE APPARATUS OF COMPRESSOR

[75] Inventors: Koji Namura; Akemi Futakawa, both of Amagasaki, Japan

[73] Assignee: Mitsubishi Denki Kabushiki Kaisha, Tokyo, Japan

[21] Appl. No.: 946,328

[22] Filed: Sep. 27, 1978

[30] Foreign Application Priority Data

Sep. 29, 1977 [JP] Japan .......................... 52/131802[U]

[51] Int. Cl.³ ............................................. F16K 15/14
[52] U.S. Cl. ..................................... 137/851; 137/856
[58] Field of Search ...................... 137/512, 512.3, 529, 137/855, 856, 857, 843, 851

[56] References Cited

U.S. PATENT DOCUMENTS

| Re. 14,943 | 8/1920 | Jackson | 137/535 X |
|---|---|---|---|
| 1,632,385 | 6/1927 | Vollman | 137/857 X |
| 1,660,588 | 2/1928 | Wishart et al. | 137/856 |
| 3,241,748 | 3/1966 | Cramer . | |
| 3,384,298 | 5/1968 | Rontgen | 137/512 |

Primary Examiner—William R. Cline
Attorney, Agent, or Firm—Oblon, Fisher, Spivak, McClelland & Maier

[57] ABSTRACT

In a discharge valve apparatus, a discharge port on a valve plate covered by a long thin discharge valve is formed in a elliptic shape as horizontal view whereby stress of the long thin discharge valve in longitudinal direction at its center is decreased and the fatigue strength of the valve is improved and reliability is high and the apparatus can be easily manufactured and the efficiency of the compressor is increased.

3 Claims, 7 Drawing Figures

DISCHARGE VALVE APPARATUS OF COMPRESSOR

BACKGROUND OF THE INVENTION

1. FIELD OF THE INVENTION:

The present invention relates to a discharge valve apparatus of a compressor.

2. DESCRIPTION OF THE PRIOR ART:

FIGS. 1 and 2 show the conventional discharge valve apparatus of a compressor.

In FIGS. 1 and 2, the reference numeral (1) designates a cylinder of a compressor; (2) designates a piston; (3) designates a valve plate on which a discharge port (4), a suction port (5) and a tapped holes (6) are formed. The reference numeral (7) designates a cylinder cover; (8) designates a discharge plenum; (9) designates a suction valve and (10) designates a long thin discharge valve and the center Q of the long thin discharge valve (10) is disposed on a center line P of the discharge port (4) as shown in FIG. 2. The reference numeral (11) designates through holes formed at the both ends of the long thin discharge valve (10); (12) designates a valve stopper having through holes (13) at the both ends; (14) designates pins which are respectively screwed in the tapped holes formed on the valve plate (3) through the springs (15), the through holes (11) of the valve (10) and the through holes (13) of a valve stopper (12) whereby the valve stopper (12) and the valve (10) are pressed to the valve plate under a specified spring force.

In the conventional discharge valve apparatus having the abovementioned structure, the stress variation as shown in FIG. 3 is caused in the longitudinal direction of the valve (10) on the surface of the valve (10) in the side of valve stopper (12) during one reciprocation of the piston (2).

In FIG. 3, the abscissa shows the time, and the ordinate shows the stress, and the point A on the abscissa shows the time when the piston locates at the top dead point, and the point B shows the time when the piston locates at the bottom dead point and the point C shows the zero stress time when the pressure of the cylinder applied to the valve becomes equal to that of the discharge plenum. During the time from the top dead point A of the piston to the zero stress point C, the pressure of the cylinder is lower than that of the discharge plenum whereby the pressure difference between the discharge plenum and the cylinder is applied inwardly to the part for closing the discharge port (4) by the valve (10) whereas compressive stress proportional to the pressure difference is applied to the external surface of the valve (10) in the side of the valve stopper (12).

In the compression stroke after passing the piston (2) through the bottom dead point B, the pressure of the cylinder gradually increases to be equal to that of the discharge plenum at the time of the point C. The pressure of the cylinder increases further to be higher than the discharge pressure whereby the drag force is applied to the valve (10). When the drag force becomes higher than the total of the resilient force of the valve (10) and the frictional forces among the valve plate (3), the valve (10) and the valve stopper (12) due to the spring force of the springs (15), the valve (10) deforms so as to curve outwardly at the central part while sliding to the horizontal direction at the pressed part and at last, the deformation of the valve (10) is restricted by the valve stopper (12). Accordingly, the tensile stress is applied to the external surface of the valve (10) in the side of the valve stopper (12) during the time from the point C to the next top dead point A' of the piston as shown in FIG. 3. Thus, the compressive stress and the tensile stress are alternatively applied to the external surface of the valve (10) during one reciprocation of the piston (2).

FIG. 4 shows longitudinal stress distribution applied on the external surface of the valve (10) during the time between the point A and the point C of FIG. 3 in the conventional discharge valve apparatus.

In FIG. 4, the reference E designates a point on the valve (10) corresponding to the peripheral part of the discharge port (4) and Q designates a point on the valve (10) corresponding to the center of the discharge port (4).

FIG. 5 shows longitudinal stress distribution applied on the external surface of the valve (10) during the time between the point C and the point A' of FIG. 3 in the conventional discharge valve apparatus.

As it is clear from FIGS. 3, 4 and 5, the largest tensile stress and compressive stress are repeatedly applied at the center Q of the valve (10) during one reciprocation of the piston (2) in the conventional discharge valve apparatus. Accordingly, it is necessary to spend a lot of time for the fabrication of the valve (10) such as punching fabrication and barrel machining for edge surfaces so as to prevent fatigue failure.

SUMMARY OF THE INVENTION:

It is an object of the present invention to provide a discharge valve apparatus which has an improved fatigue strength and high reliability.

It is another object of the present invention to provide a discharge valve apparatus which is easily manufactured.

It is the other object of the present invention to provide a discharge valve apparatus which increases efficiency of a compressor.

The present invention is to provide a discharge valve apparatus of a compressor comprising a valve plate having a discharge port; a long thin discharge valve covering said discharge port; a valve stopper overlaying on said long thin discharge valve, and holding means for holding said long thin discharge valve on said valve plate at a specific position so as to be capable of bending said long thin discharge valve depending upon an actuation of said compressor, wherein said discharge port is formed in elliptic shape on the surface of said valve plate.

Figure 7:
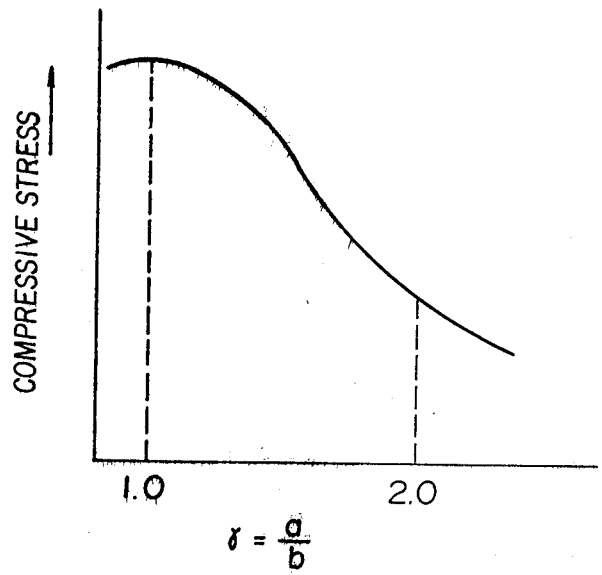
FIG. 7 is a graph showing the relation between the ratio of "a" to "b" of the discharge port in a constant area and stress at point Q on the external surface of the long thin discharge valve in longitudinal direction.
Figure 6:
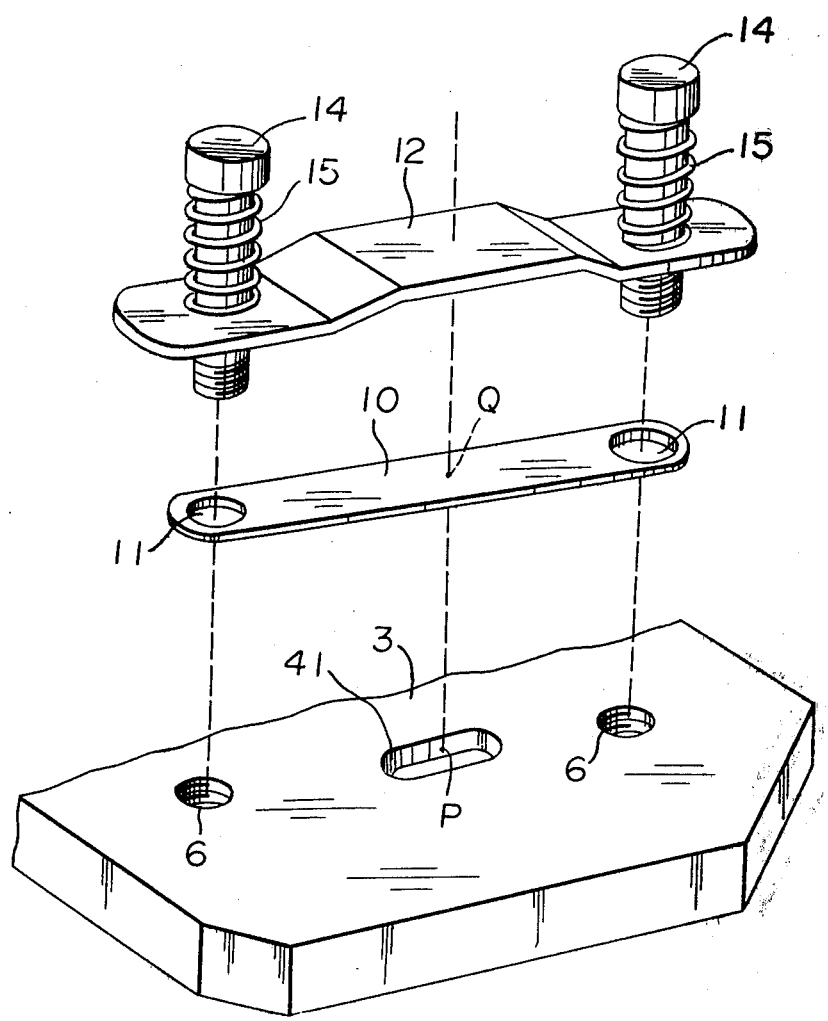
FIG. 6 is an exploded perspective view of one embodiment of the discharge valve apparatus according to the present invention.

DETAILED DESCRIPTION OF THE PREFERRED EMBODIMENTS:

Referring to FIGS. 6 and 7, one embodiment of the present invention will be illustrated.

Figure 1:
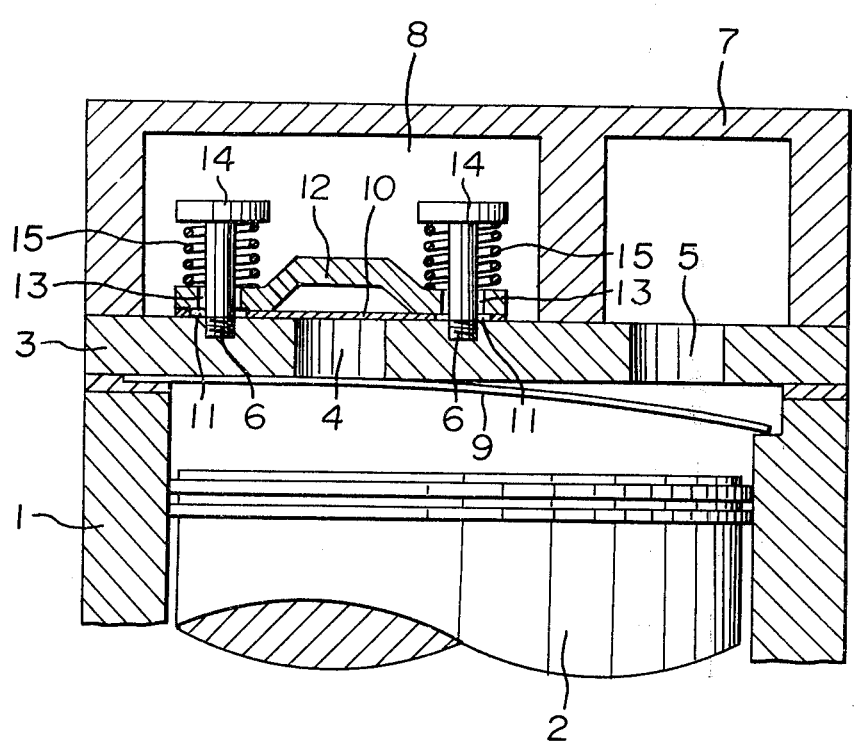
FIG. 1 is a vertical section view of the conventional discharge valve apparatus of compressor.
Figure 2:
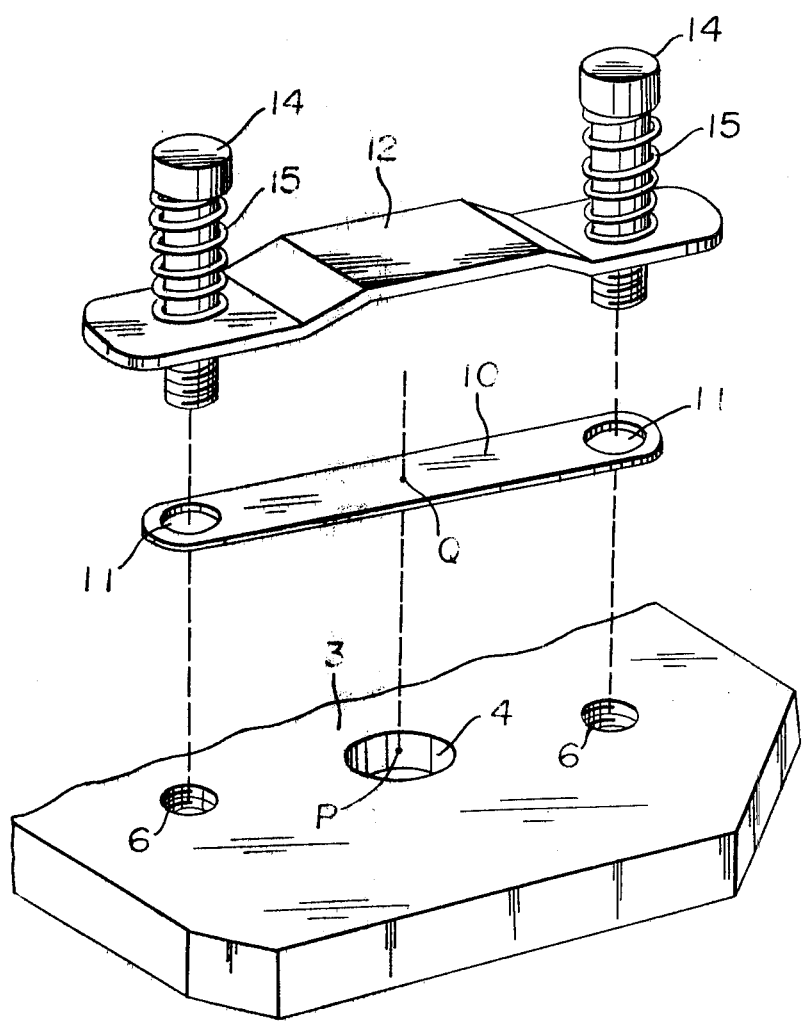
FIG. 2 is an exploded perspective view of the main part of the apparatus of FIG. 1.
Figure 3:
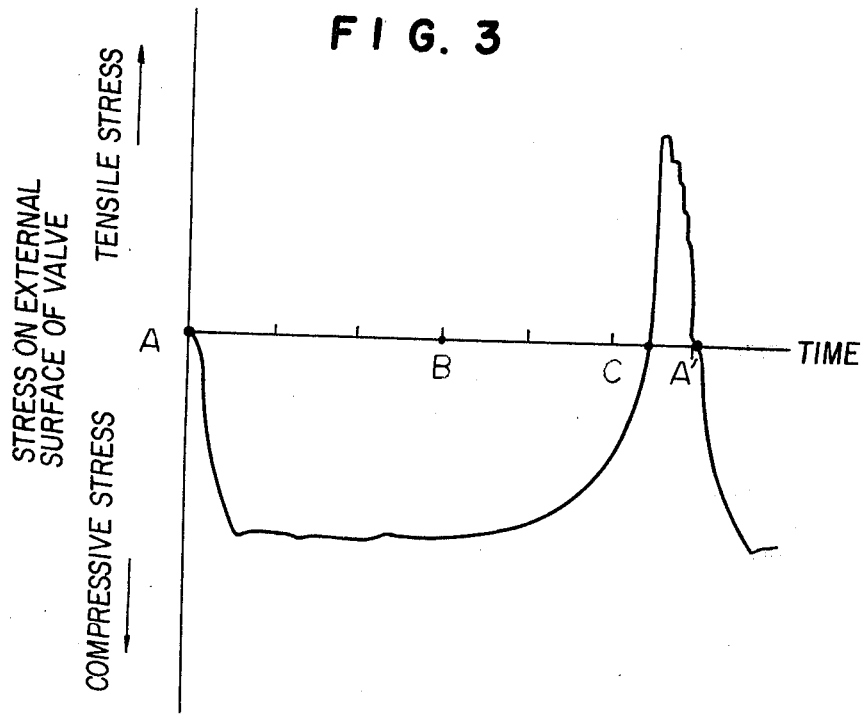
FIG. 3 is a graph showing variation of stress given on the external surface of a valve at the center in the conventional discharge valve apparatus of a compressor.
Figure 4:
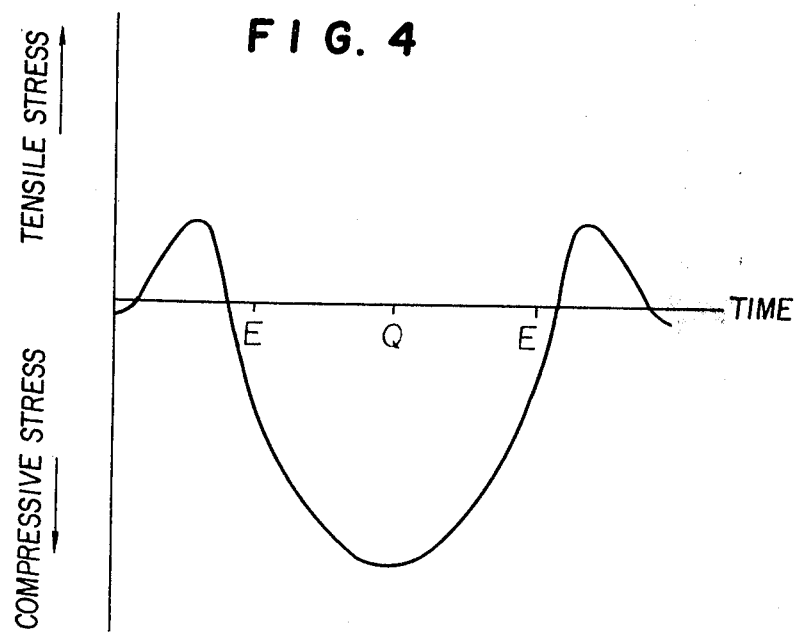
FIG. 4 is a graph showing stress distribution on the external surface of the valve when pressure difference is applied.
Figure 5:
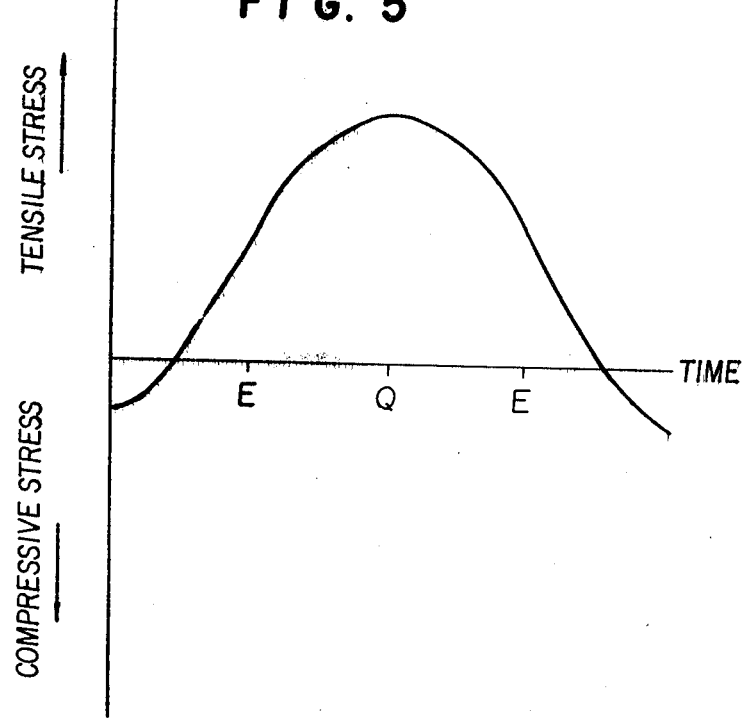
FIG. 5 is a graph showing stress distribution on the external surface of the valve when drag force is applied.

In the embodiment of the present invention shown in FIG. 6, the discharge port (41) is a through hole having an elliptic shape in longitudinal direction of the long thin discharge valve (10) and the center P of the elliptic discharge port (41) is conformed with the center Q of the valve. The structures of the other parts are similar to those of the conventional discharge valve apparatus shown in FIGS. 1 and 2.

The area of the elliptic discharge port (41) is given to be substantially the same with the area of the discharge port (4) of the conventional apparatus which is required for the compressor.

FIG. 7 shows the relation between a ratio $\gamma = a/b$ and the compressive stress in the longitudinal direction on the external surface at the center Q of the valve (10) corresponding to the center P of the discharge port (41) when "a" and "b" are varied in the case of a constant area of the discharge port (41) wherein "a" designates a longitudinal length and "b" designates a width of the elliptic discharge port (41).

It is clearly understood from FIG. 7 that the compressive stress in the longitudinal direction on the valve (10) is decreased depending upon increasing the ratio $\gamma = a/b$.

That is, the compressive stress in longitudinal direction on the valve (10) can be remarkably decreased in example, it can be decreased to be about a half or lower than that of the round discharge port (4) in the conventional apparatus ($\gamma = 1.0$) when the shape of the discharge port (41) is elongated in longitudinal direction to give the ratio $\gamma = 2.0$. Thus, the alternative stresses applied to the valve (10) is decreased to be about 75% or lower whereby the fatigue strength of the valve (10) is remarkably improved and the reliability of the valve (10) is improved.

The resistance for passing a refrigerant gas through a gap between the valve plate (3) and the valve (10) to the discharge plenum during the discharging stroke of the compressor, is decreased by increasing the ratio $\gamma$ of the discharge port (41) to elongate the shape in the longitudinal direction of the valve (10) whereby the abnormal rising of the pressure in the cylinder is prevented and the efficiency of the compressor is improved.

In the above-mentioned embodiment, the shape of the discharge port (41) is elongated in the longitudinal direction of the valve (10). Thus, the similar effect can be attained by elongating the shape of the discharge port in the transversal direction of the valve (10).

In accordance with the present invention, the area of the discharge port formed on the valve plate is the same with that of the discharge port of the conventional apparatus and only the shape of the discharge port is varied to be elliptic whereby the stress in the longitudinal direction of the valve at the center of the long thin discharge valve can be decreased and accordingly, the fatigue strength of the long thin discharge valve can be improved and the reliability can be improved.

Moreover, the resistance for passing a refrigerant gas through the gap between the long thin discharge valve and the valve plate can be decreased whereby the efficiency of the compressor can be improved. Further, there are advantageous merits that the life of a punch and a die used for punching fabrication can be prolonged and the time for barrel machining can be shortened.

What is claimed as new and desired to be secured by Letters Patent of the United States is:

1. In a discharge valve apparatus of a compressor comprising a valve plate having a single discharge port; a long thin discharge valve covering said discharge port;
a valve stopper overlaying on said long thin discharge valve and holding means for holding said long thin discharge valve on said valve plate at a specific position so as to be capable of bending said long thin discharge valve depending upon the actuation of said compressor;
wherein said discharge port is formed in an elliptic shape on the surface of said valve plate, whereby the compressive stress on said valve adjacent said discharge port is decreased.

2. A discharge valve apparatus of a compressor according to claim 1 wherein the shape of said discharge port on the surface of said valve plate is an elliptic shape elongated in the longitudinal direction of said valve.

3. A discharge valve apparatus of a compressor according to claim 1 or 2, wherein said holding means is an elastic holding means which allows bending and sliding of said valve.

* * * * *